United States Patent [19]

Osborne

[11] Patent Number: 4,718,732
[45] Date of Patent: Jan. 12, 1988

[54] WHEEL ADAPTER

[75] Inventor: David B. Osborne, Elkhart, Ind.

[73] Assignees: Centurion-Lehman, Inc.; Eugene Lehman, both of White Pigeon, Mich.

[21] Appl. No.: 896,901

[22] Filed: Aug. 15, 1986

[51] Int. Cl.⁴ .............................................. B60B 11/00
[52] U.S. Cl. ............................ 301/36 R; 301/9 DN; 301/128
[58] Field of Search ............... 301/5 R, 9 DN, 36 R, 301/40 S, 6 R, 6 D, 6 S, 111, 114, 128

[56] References Cited

U.S. PATENT DOCUMENTS

| 4,135,765 | 1/1979 | Hardwicke | 301/128 X |
| 4,261,621 | 4/1981 | Fox | 301/9 DN X |
| 4,333,688 | 6/1982 | Lemmon et al. | 301/36 R |
| 4,521,059 | 6/1985 | Saruwatari | 301/36 R |
| 4,585,276 | 4/1986 | Tirheimer | 301/36 R |

Primary Examiner—David A. Scherbel
Assistant Examiner—Russell D. Stormer
Attorney, Agent, or Firm—Flynn, Thiel, Boutell & Tanis

[57] ABSTRACT

An adapter for facilitating a mounting of one or more wheels on a vehicle wheel hub having plural externally threaded wheel studs of a finite length secured thereon. The adapter has a cylindrical adapter body with plural parallel holes extending therethrough, each of the plural holes being adapted to receive in one end thereof an externally threaded wheel stud. An elongated bolt is snugly received in an end of each of the plural holes remote from the one end, each bolt having an enlarged head intermediate its length and engaging a shoulder on the adapter. An internally threaded opening is provided at one end and is adapted to be threadedly coupled to the wheel stud. An externally threaded stud is provided at the other end. Each bolt further has a recess therein intermediate the one end and the enlarged head. A barrier is fixedly and removably received in the recess. The barrier has a portion positioned adjacent an abutment surface on the adapter for preventing a substantial relative axial movement between each bolt and the adapter body and a withdrawal of the bolts from the plural holes. An internally threaded nut is threadedly engaged with the externally threaded stud for clamping one or more wheels between each nut and the wheel mounting surface.

8 Claims, 3 Drawing Figures

WHEEL ADAPTER

FIELD OF THE INVENTION

This invention relates to an adapter for mounting one or more wheels on a vehicle wheel hub.

BACKGROUND OF THE INVENTION

It is common among pickup truck owners to want to modify the front and rear wheel setup for better offroad travel and better traction. Such modifications include the mounting of dual wheels at the rear and widening the spacing between the front wheels. In order to accomplish the modification task, adapters have been provided which allow for the mounting of dual wheels at the rear onto the standard vehicle wheel hub (See U.S. Pat. No. 4,521,059). Problems have developed in this modification because of the lack of a secure attachment and a lack of concentric mounting on the vehicle wheel hub. Further, such hubs, when improperly balanced, tend to vibrate loose thereby making the modification unsafe. Accordingly, it is desirable to provide a safer adapter for allowing the mounting of one or more wheels on a vehicle wheel hub.

Accordingly, it is an object of this invention to provide an adapter for mounting one or more wheels on a vehicle wheel hub, which adapter has structure thereon for preventing the inadvertent loosening of bolts which fixedly attach the adapter to the vehicle wheel hub.

It is a further object of this invention to provide an adapter as aforesaid which is of a unitary construction thereby enabling a manufacture thereof and a maintenance of a rotationally balanced product.

It is a further object of this invention to provide an adapter, as aforesaid, which allows for the individual removal of the nuts holding the one or more wheels onto the adapter without an inadvertent removal of the bolts holding the adapter onto the vehicle wheel hub.

It is a further object of this invention to provide an adapter, as aforesaid, which requires no maintenance, is safe in use and which provides a durable support for the one or more wheels mounted on the vehicle wheel hub.

SUMMARY OF THE INVENTION

In general, the objects and purposes of the invention are met by providing an adapter for mounting one or more wheels on a vehicle wheel hub which has plural externally threaded wheel studs of a finite length secured thereto. The adapter includes a cylindrical adapter body having a central opening therethrough adapted to receive the wheel hub therein. The adapter body further has plural holes extending therethrough and concentrically arranged about the axis of the central opening. The plural holes each are adapted to receive in one end thereof the externally threaded wheel studs. An elongated bolt is snugly received in each of the holes in the end thereof remote from the end into which the wheel stud is received. Each bolt has an internally threaded opening at one end adapted to be threadedly coupled to the wheel stud and an externally threaded stud at the other end. Intermediate the length of the bolt there is provided an enlarged head adapted to engage a shoulder encircling each of the holes in the adapter so that the adapter becomes clamped between the enlarged head and the vehicle wheel hub upon a tightening of the bolts onto the wheel studs. A free space is provided on the adapter and which opens into each of the holes. An abutment surface is provided in the free space. Each bolt further has a recess intermediate the enlarged head and the internally threaded end adapted to receive therein a barrier member which is fixedly and removably receivable in the recess. The barrier, when inserted into the recess is adapted to engage the abutment surface for preventing a substantial relative axially movement between the bolt and the adapter body as well as preventing a withdrawal of the bolts from the plural holes. An internally threaded nut is adapted to be threadedly engaged with the externally threaded stud for facilitating a clamping of the one or more wheels between each nut and the adapter.

BRIEF DESCRIPTION OF THE DRAWINGS

Further objects and purposes of this invention will be apparent to persons acquainted with apparatus of this general type upon reading the following specification and inspecting the accompanying drawings in which.

DETAILED DISCUSSION

Figure 1:
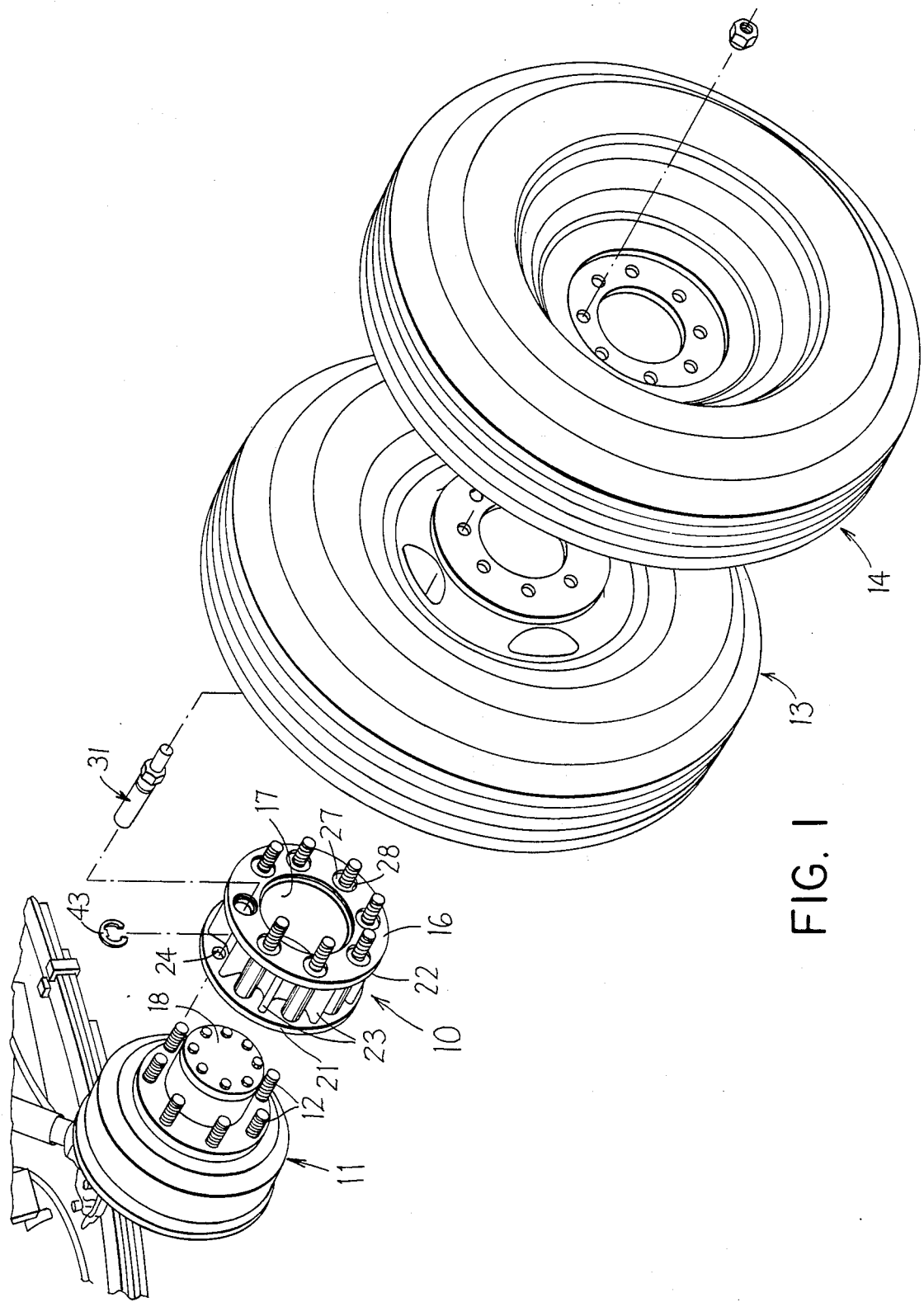
FIG. 1 is an exploded perspective view of an adapter embodying the invention and the dual wheels which are to be fixedly mounted thereon and to a vehicle wheel hub.

Certain terminology may be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

FIG. 1 illustrates an exploded perspective view of an adapter 10 embodying the invention and for use generally on the rear vehicle wheel hubs. However, the adapter 10 is adapted to be mounted on to any vehicle wheel hub 11 which has a plurality of externally threaded wheel studs 12 of a finite length secured thereto and projecting axially of the wheel hub therefrom. The adapter 10 in FIG. 1 allows for the mounting of dual wheels 13 and 14 to the vehicle wheel hub 11. A single wheel can be mounted thereon, if desired.

Figure 2:
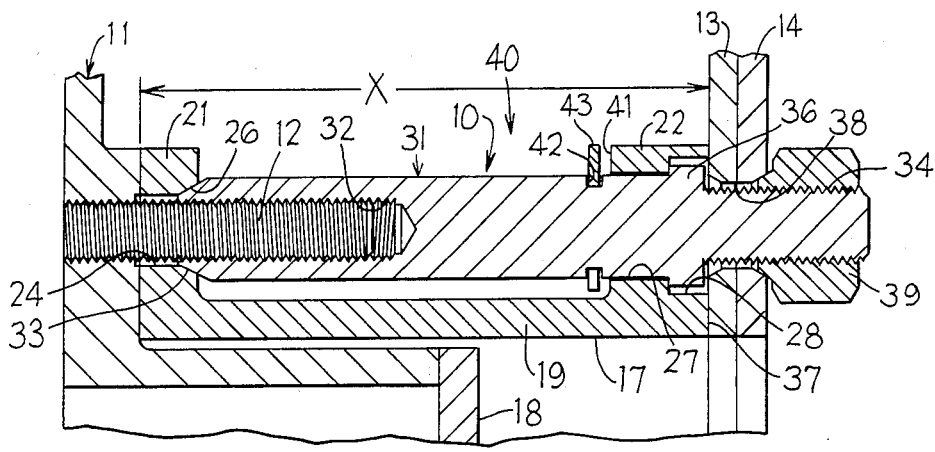
FIG. 2 is a fragmentary sectional view of the adapter taken along a longitudinal center line of one of the holes provided in the adapter, such as along the line II—II of FIG. 3.
Figure 3:
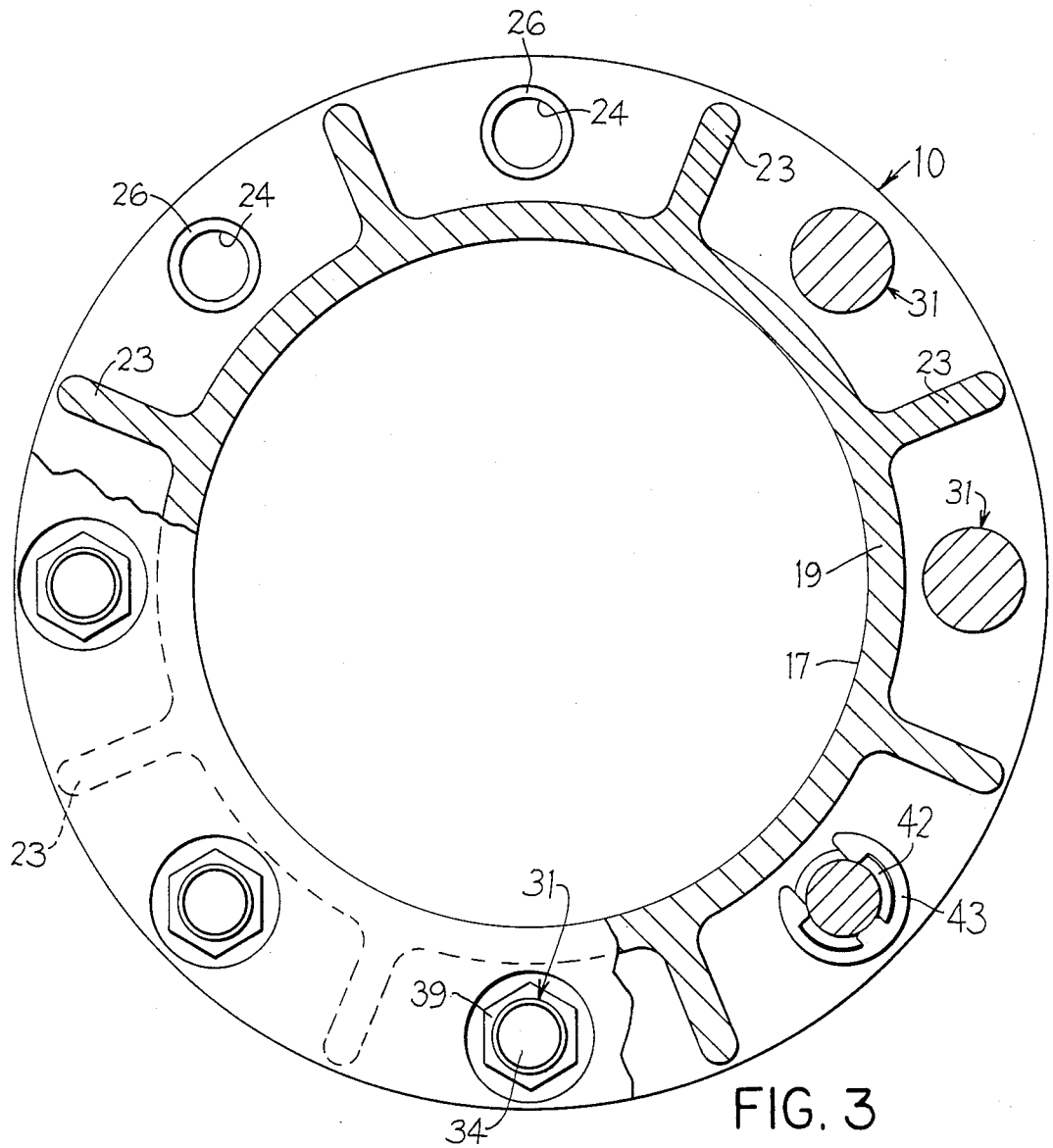
FIG. 3 is an end view of the adapter taken along the line III—III of FIG. 2 with a portion of the adapter and the bolts holding the adapter to the vehicle wheel hub being sectioned.

More specifically, the adapter 10 includes a cylindrical adapter body 16 having a central opening 17 therethrough which is adapted to receive therein an extension 18 of the vehicle wheel hub 11. The adapter body 16 could be of a cylindrical construction throughout its axial length X (FIG. 2). However, I have discovered that material can be removed from the central portion of the adapter body as best illustrated in FIGS. 1 and 3. That is, I have provided a generally cylindrical hollow shell 19 having at opposite ends thereof radially outwardly extending flanges 21 and 22. I have also provided radially outwardly extending web sections 23 on the cylindrical shell 19, which webs 23 extend axially of the adapter and are integrally united with each of the flanges 21 and 22.

A plurality of axially extending holes 24 are provided through the flange 21. The arcuate spacing between the plural holes 24 conforms to the arcuate spacing between the vehicle wheel studs 12. The axial thickness of the flange 21 is less than the axial length of the vehicle wheel studs 12 so that a portion of the vehicle wheel stud will extend between the flanges 21 and 22 as illustrated in FIG. 2. Each hole is provided between a radially outwardly extending web 23 as illustrated in FIG. 3. Further, the edge of each hole 24 on a side of the flange 21 remote from the vehicle hub 11 is chamfered as at 26. Similarly, plural holes 27 are provided in the flange 22, which holes are axially aligned with the holes 24 in the flange 21. Further, the holes 27 are larger in diameter for a purpose that will be explained in more detail below. Each hole 27 is countersunk as at 28 in FIG. 2.

Plural elongated bolts 31 are provided and each is adapted to be received through the larger diameter holes 27 in the flange 22 of the adapter body 16. Each bolt has at one end an internally threaded, axially centrally extending hole 32 therein. This same end of the bolt has a chamfer provided as at 33, the angle of the chamfer conforming to the angle of the chamfer 26 as illustrated in FIG. 2. The end of the bolt 31 remote from the aforesaid end is externally threaded as at 34. The thread 34 is opposite handed to the thread in the hole 32. Intermediate the internally threaded end and the externally threaded end there is provided an enlarged hex-shaped head 36, the outer most extremity of which fits into the counter-sinking 28 encircling each of the holes 27. Further, the axial thickness of the heads 36 is less than the depth of the counter-sinking 28. The hex-shaped heads 36 are adapted to be engaged by a socket-like tool to cause a rotation of the bolts 31 and allow for a threaded coupling between the internally threaded holes 32 and the externally threaded wheel studs 12. As the bolts 31 are tightened, the chamfered end 33 of each bolt will engage the chamfer 26 to effect a centering of the stud 12 within the holes 24. A further tightening of the bolts 31 will cause the adapter body 16 to become clamped between the heads 36 and the vehicle wheel hub 11. The heads 36 of each of the bolts 31 will be recessed into the counter-sinking 28 below a wheel mounting surface 37.

One or more wheels 13 and/or 14 can now be mounted to the adapter by aligning the holes 38 in the hub(s) with the axially extending externally threaded portions 34 of each of the bolts 31 as illustrated in FIG. 2. An internally threaded nut is to be threadedly coupled to each of the externally threaded portions 34 of the bolts 31 to effect a clamping of one or more wheels 13 and/or 14 between the nuts 39 and the wheel mounting surface 37.

The axial spacing between the flanges 21 and 22 and between the mutually adjacent web sections 23 define a free space which opens into each of the holes 24 and 27. The surface of the flange 22 facing into this free space 40 defines an abutment surface 41. An annular groove 42 is provided in each bolt on a section of the bolt that is exposed in the aforesaid free space 40. In this particular embodiment, the annular groove 42 is positioned along the length of the bolt 31 so that it is located closely adjacent the abutment surface 41 when the bolts 32 all have been tightly secured to the vehicle wheel studs 12. A C-shaped spring clip 43 having an axial thickness slightly less than the axial width of the groove 42 is received into each groove. The radially outwardly extending dimension of each spring clip 43 is sufficient to block removal of the bolts 31 through the holes 27 due to an engagement of the spring clip 43 with the abutment surface 41. It is preferable that the spring clip 43 be spaced as close as possible to the abutment surface 41 but yet allowing a conventional tool to be utilized to effect a removal of the spring clip at any desired time. In this particular embodiment, the spring clip 43 is spaced from the abutment surface 41 approximately the distance generated by a rotation of the bolt through 1 to 5 turns. Optimally, the spacing will be equal to the distance generated by 2 rotations of the bolt 31, namely, about 2 mm.

In use, and with the spring clips 43 in place as illustrated in FIG. 2, it is impossible to remove the bolts 31 even with the use of a tool engaging the hexshaped heads 36. Thus, vibrations that may occur to the wheel thereby attempting to loosen the bolts 31 will not cause a total disengagement of the bolts 31 from the wheel studs 12. Yet, if it is desired to remove the adapter 10, such can be easily accomplished by first removing the wheel(s) 13 and/or 14 so that access is provided to the free space 40. A conventional tool can be utilized in effecting a removal of the spring clip 43 from the groove 42. Thereafter, it will be possible to remove the bolts 31 from there engagement with the wheel studs 12 in a conventional manner.

It is to be noted that it is theoretically possible to rotate the bolts 31 simultaneously to effect a disengagement of the bolts from their engagement with the vehicle wheel studs 12. Such simultaneous rotation would not require the bolts 31 to move axially relative to the flange 22. Separation would, however, occur between the flange 21 and the vehicle wheel hub 11. While such simultaneous rotation of the bolts may be possible by use of a special tool, I am relying on the extremely low probability that the bolts 31 will vibrate loose at the same rate. Therefore, the adapter 10 will remain fixedly secured to the vehicle wheel hub via the wheel studs 12.

If the adapter 10 is to be used on the front wheels of the vehicle to space the front wheels further apart, the dimension X is generally more than for a use with dual wheels on the rear. For example, the X dimension for a dual wheel use is generally about 3.2 inches whereas for a single wheel use it is about 4.5 inches.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An adapter for facilitating a mounting of one or more wheels on a vehicle wheel hub having plural externally threaded wheel studs of a finite length secured thereon, comprising:
    a cylindrical adapter body having a central opening therethrough adapted to receive said wheel hub therein, said adapter body further having means defining plural parallel holes extending therethrough and concentrically arranged about an axis of said central opening, said plural holes each being adapted to receive in one end thereof said externally threaded wheel studs, said plural holes having an effective length greater than said finite length of said wheel studs;

wheel mounting surface means on said adapter;

shoulder means located on said wheel mounting surface means and encircling each of said holes at an end thereof remote from said one end;

means defining a radially facing free space intermediate said shoulder means and said one end and an adjacent abutment surface means, said free space opening into each of said holes;

an elongated bolt snugly received in an end of each of said plural holes remote from said one end, each bolt having an enlarged head intermediate its length and engaging said shoulder means, an internally threaded opening at one end thereof adapted to be threadedly coupled to said wheel stud, and an externally threaded stud at the other end, each said bolt further having a recess means therein intermediate said one end and said enlarged head, said recess means being exposed in said free space;

barrier means fixedly and removably received in said free space and said recess means, said barrier means having a portion positioned adjacent said abutment surface means for preventing a substantial relative axial movement between each said bolt and said adapter body and a withdrawal of said bolts from said plural holes; and an internally threaded nut threadedly engaged with said externally threaded stud for clamping said one or more wheels between each said nut and said wheel mounting surface means.

2. An adapter according to claim 1, wherein said adapter body includes a pair of radially extending and axially spaced flanges, said means defining plural parallel holes are provided on each of said flanges, the plural holes in each flange being axially aligned with each other;

wherein each hole in one flange remote from the holes into which said wheel stud is received and on a side thereof having said wheel mounting surface means has a countersunk recess encircling said hole to define said shoulder means to receive said enlarged head therein to a sufficient depth to position said enlarged head entirely therein spaced from said wheel mounting surface means;

wherein said abutment surface means is on a side of said one flange opposite from said side having said countersunk recess therein; and wherein said radially facing free space is defined by a spacing between said axially spaced flanges.

3. An adapter according to claim 1, wherein said externally threaded stud on each said bolt is opposite handed to said external thread on each said wheel stud.

4. An adapter according to claim 1, wherein said barrier means is spaced from said abutment surface means a distance equal to the distance traveled by said bolt when it rotates relative to said wheel stud in the range of 1 to 5 turns.

5. An adapter according to claim 4, wherein the number of turns is 2.

6. An adapter according to claim 1, wherein said recess means on each said bolt is an annular groove, and wherein said barrier means is a C-shaped spring ring received in said annular groove.

7. An adapter according to claim 1, wherein said adapter body includes a pair of radially extending and axially spaced flanges and plural radially and axially extending webs connecting said flanges.

8. An adapter according to claim 7, wherein each hole in each flange is oriented between mutually adjacent ones of said webs.

* * * * *